United States Patent [19]

Mollot et al.

[11] Patent Number: 5,706,645
[45] Date of Patent: Jan. 13, 1998

[54] REMOVAL OF OXIDES OF NITROGEN FROM GASES IN MULTI-STAGE COAL COMBUSTION

[75] Inventors: Darren J. Mollot, Morgantown, W. Va.; Donald L. Bonk, Louisville, Ohio; Thomas E. Dowdy, Orlando, Fla.

[73] Assignee: The United States of America as represented by the United States Department of Energy, Washington, D.C.

[21] Appl. No.: 635,422

[22] Filed: Apr. 10, 1996

[51] Int. Cl.[6] .................................................. F02C 3/28
[52] U.S. Cl. ..................................... 60/39.06; 60/39.12
[58] Field of Search ........................... 60/39.06, 39.12, 60/39.182, 39.464

[56] References Cited

U.S. PATENT DOCUMENTS 5,161,367  11/1992  Scalzo ............................ 60/39.12
5,255,506  10/1993  Wilkes et al. ..................... 60/39.12
5,469,698  11/1995  Garcia-Mallol .................... 60/39.12

*Primary Examiner*—Louis J. Casaregola
*Attorney, Agent, or Firm*—Lisa A. Jarr; Stephen D. Hamel; William R. Moser

[57] ABSTRACT

Polluting $NO_x$ gas values are removed from off-gas of a multi-stage coal combustion process which includes an initial carbonizing reaction, firing of char from this reaction in a fluidized bed reactor, and burning of gases from the carbonizing and fluidized bed reactions in a topping combustor having a first, fuel-rich zone and a second, fuel-lean zone. The improvement by means of which $NO_x$ gases are removed is directed to introducing $NO_x$-free oxidizing gas such as compressor air into the second, fuel-lean zone and completing combustion with this source of oxidizing gas. Excess air fed to the fluidized bed reactor is also controlled to obtain desired stoichiometry in the first, fuel-rich zone of the topping combustor.

3 Claims, 2 Drawing Sheets

REMOVAL OF OXIDES OF NITROGEN FROM GASES IN MULTI-STAGE COAL COMBUSTION

FIELD OF THE INVENTION

This invention relates to multi-stage combustion of gases produced from coal, biomass, wastes, or other materials which can be processed to produce combustible gases.

BACKGROUND OF THE INVENTION

Coal remains a primary source of fuel to meet this country's energy requirements. Extensive research and development have been carried out in an effort to provide coal-burning processes and equipment that would give maximum efficiency, consistent with meeting exhaust emissions requirements. Gasification followed by combustion of the product gases in a high efficiency power cycle offers a potentially attractive alternative to direct combustion in conventional plants. One approach to a power production cycle partially gasifies coal in a carbonizer unit. This process produces a hot, low-heating-value syngas. Char from the carbonizer is fired in a pressurized fluidized bed, yielding a hot, oxygen-rich off-gas. The two gas streams are mixed and are burned in a topping combustor to energize a gas turbine. A specific version of this type of cycle is known as the second generation pressurized fluidized bed combustor or advanced pressurized fluidized bed combustor (APFBC) system. An advantage of the APFBC is that state of the art combustion turbine inlet temperatures can be achieved so as to provide high efficiency, even though the carbonizer and pressurized fluidized bed combustor (PFBC) may be limited to temperatures of about 1,400° to 1,900° F. by hot gas cleanup, in-situ sulfur capture and other chemistry considerations, and chemical energy content considerations. A disadvantage of existing systems of this type is that polluting oxides of nitrogen ($NO_x$) present in gases produced in the PFBC and carbonizer reactors pass through the topping combustor and out the stack into the environment. Oxides of nitrogen in these gases arise from two sources, conversion of solid nitrogen compounds in the coal to oxide form and by fixation of nitrogen from the air at high temperatures. Minimizing of formation of $NO_x$ products in the multi-annular swirl burner (MASB) used as a topping combustor is disclosed in U.S. Pat. No. 4,845,940, issued Jul. 11, 1989, to Beer. This result is achieved by the use of a first, fuel-rich zone to prevent conversion of fuel-bound nitrogen to $NO_x$ and a second, fuel-lean zone wherein combustion products from the first zone are rapidly mixed with combustion air at temperatures low enough to prevent the formation of thermal $NO_x$. While effective in preventing formation of new $NO_x$ products within the MASB, $N_xO$ products which are already present in off-gas from the PFBC are not destroyed. Most of them bypass the first reacting stage of the MASB and remain in a gas effluent. It is desired to provide an improvement to the second generation AFPBC wherein the amount. of $NO_x$ already present in pressurized fluidized bed off-gas in the cycle is reduced in the MASB, while maintaining the system's ability to inhibit the formation of additional amounts of these pollutants.

SUMMARY OF THE INVENTION

The present invention is directed to an improvement in multi-stage combustion processes for burning a carbonaceous fuel, in particular coal, which processes include an initial carbonizing or gasifying step in a first reactor whereby combustible syngas and char may be produced, firing at least a portion of the products of the first reactor in a second, pressurized reactor, producing a $NO_x$ laden combustible exhaust gas and firing the combustible gases from the first and second reactors in a third, topping combustor reactor having a first, fuel-rich zone and a second, fuel-lean zone. The second reactor in such processes normally comprises a pressurized fluidized bed reactor into which may be fed solid chars obtained in the first reactor, or may be fed from any other source.

In the improvement of the present invention, composition of input gases to the second reactor is controlled to provide a desired stoichiometry so that only sufficient oxidizer is present in this reactor to feed the first, fuel-rich zone of the topping combustor. Exhaust gas from the second reactor may be laden with $NO_x$, and feeding this gas directly into the second, fuel-lean zone of the topping combustor is to be avoided. Completion of combustion in the second, fuel-lean zone is instead obtained by feeding only $NO_x$-free compressor air into this zone. This results in conversion of entering $NO_x$ to diatomic nitrogen.

It is therefore an object of this invention to provide a process for the destruction of $NO_x$ gases contained in a $NO_x$-laden off-gas from initial stages of a multi-stage coal combustion system as well as for reduction of the formation of additional $NO_x$.

DESCRIPTION OF THE PRIOR ART

Figure 1:
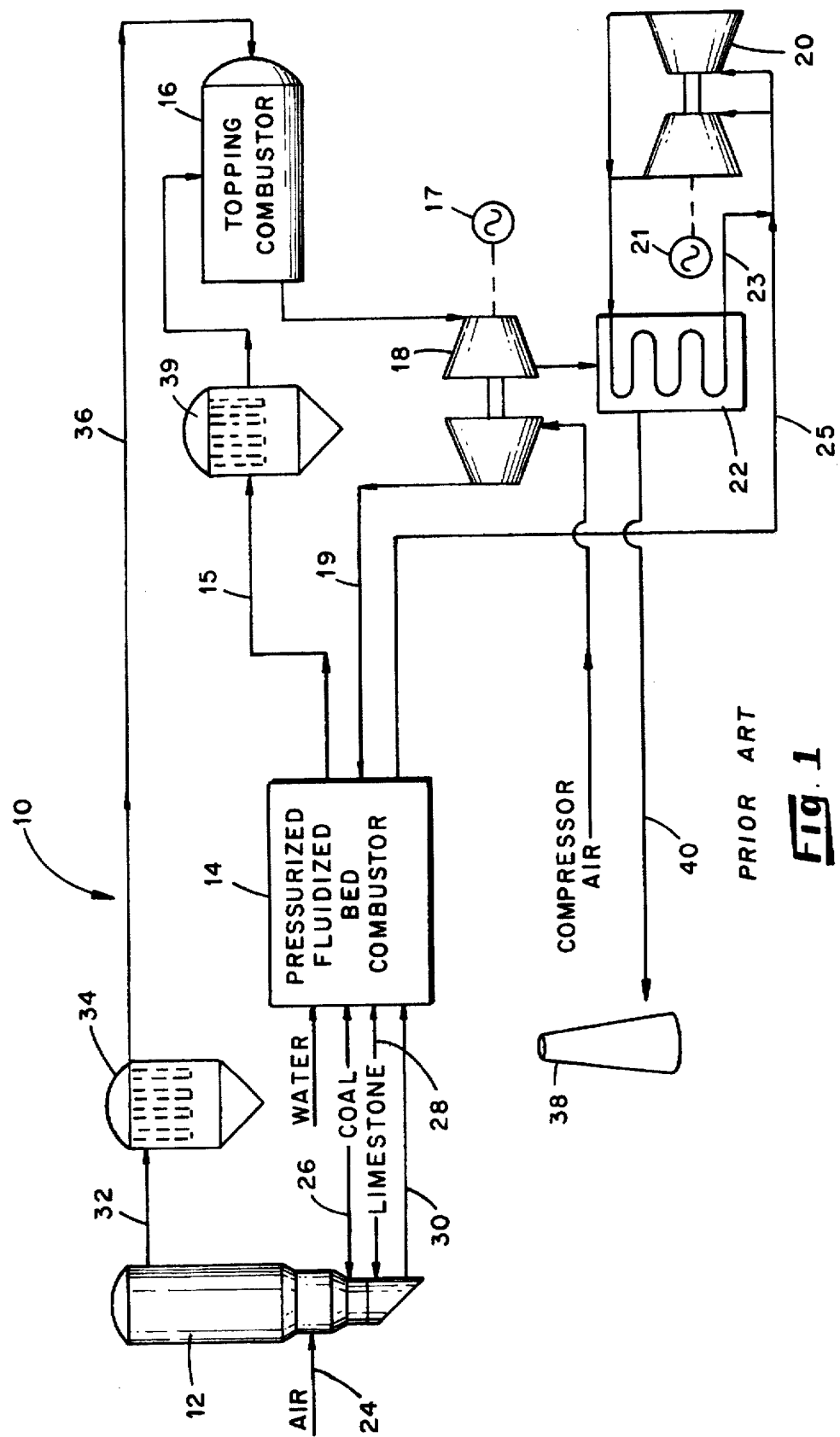
FIG. 1 is a schematic view of a prior art advanced pressurized fluidized bed combustion system (APFBC) in which the improvement of the present invention may preferably be employed.

FIG. 1 depicts an APFBC system before modification by the present invention. The system includes a carbonizer or partial gasifier 12, a pressurized fluidized bed combustor 14, and a topping combustor 16 into which off-gases from the carbonizer and fluidized bed combustor are fed. Char produced in carbonizer 12 is fed into the fluidized bed combustor 14 through duct 30. The topping combustor employs a multi-annular swirl burner (MASB) which provides a first, fuel-rich zone and a second, fuel-lean zone downstream from the first zone. Power is produced by a gas turbine 18 fired by gases from the topping combustor 16. Compressor air is fed from the turbine 18 to the fluidized bed combustor through duct 19. A steam turbine 20 receives steam obtained from a heat recovery steam generator 22 through duct 23 and from the pressurized fluidized bed 14 through duct 25 produce power. Off-gas from the steam generator 22 is fed to stack 38 through duct 40. The power produced by the turbines 18 and 20 may be used to generate electrical power by means of generators 17 and 21, respectively, driven thereby.

The overall system is designed for maximum efficiency using multiple combustion stages in combination with heat recovery and recycling to an additional generator. These high electric conversion efficiencies are obtained while formation of additional amounts of $NO_x$ in the MASB topping combustor is avoided. However, $NO_x$ which already exists in the PFBC exhaust is not affected by the MASB and passes through to the environment unless expensive post-combustion treatments are used.

Carbonizer/partial gasifier 12 may comprise a pressurized reactor operated under conditions such as to produce a syngas suitable for feeding to topping combustor 16. The carbonizer is provided with ducts 24, 26, and 28 for introducing air, coal, and limestone, respectively, and duct 30, for removal of char produced in a carbonizing reaction. Limestone is provided in the reactor in order to capture sulfur.

The carbonizer may preferably be operated at a temperature of 1,500° to 1,900° F. and a gas pressure of 0 to 500 psig. Input coal is kept in the reactor for a residence time sufficient to produce a combustible syngas and to obtain a char product made up of solid material. The char retains a combustible character and is converted to hot flue gas and ash in the pressurized fluidized bed reactor 14.

Off-gas from the carbonizer, which moves outward through duct 32, has a gas composition capable of sustaining combustion in the topping combustor. The small solid particles which are entrained in the gas are removed by hot gas filter 34. Depending on the fixed nitrogen content of the starting coal, the resulting hot fuel gas from the carbonizer may have an $NH_3$ content as high as 8,000 parts per million. Upon being filtered, the hot fuel gas from the carbonizer is fed through duct 36 into the fuel-rich zone of topping combustor 16 and reacted therein under conditions selected to convert most of the $NH_3$ from the source to $_2N$. The oxygen-rich off-gas from the pressurized fluid bed 14 typically contains 80 to 140 ppm $NO_x$. In the prior art design, FIG. 1, 75% of this off-gas by-passes the $NO_x$-reducing fuel-rich zone of the topping combustor and makes its way to the oxygen-rich zone and out to the atmosphere. This bypassing of $NO_x$-containing off-gas around the fuel-rich zone has resulted from a need to accommodate the large amount of off-gas produced by the PFB, which has typically included 12% excess oxygen.

DESCRIPTION OF THE PREFERRED EMBODIMENT

Figure 2:
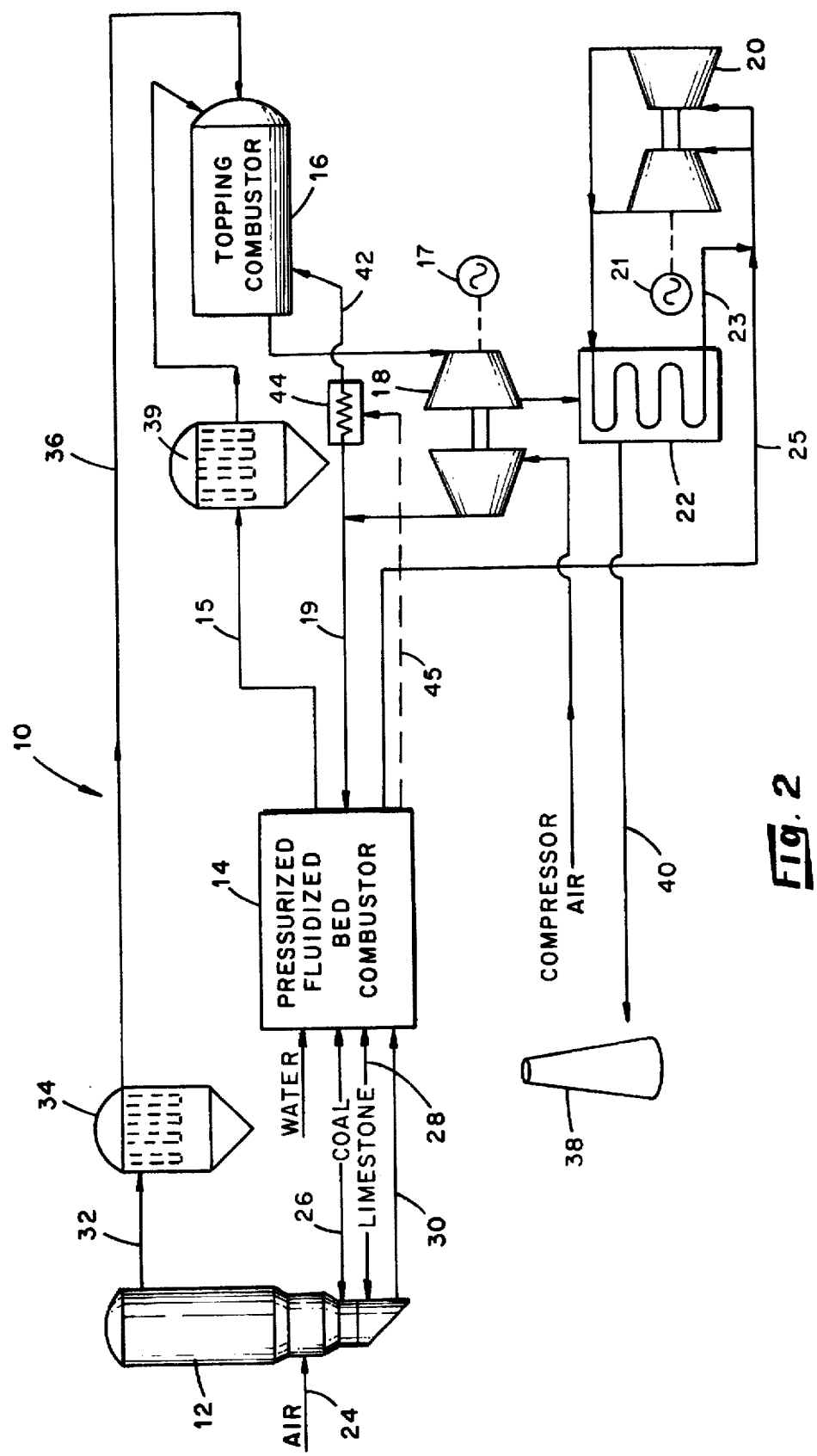
FIG. 2 is a schematic view of the APFBC of FIG. 1 as modified in accordance with the present invention.

Referring to FIG. 2 of the drawings, the combustion system and process depicted therein are substantially the same as in the prior art shown in FIG. 1, except that compressor air, free of $NO_x$, may be preheated in a heat exchanger 44 using waste heat from the pressurized fluid bed reactor, as illustrated by dashed line 45, and is fed into the fuel-lean second stage of topping combustor 16 as well as to the fluidized bed combustor. The compressor air is provided through air duct 42 connected to duct 19. Line 42 is coupled to an opening (not shown) in the fuel-lean zone for introduction of $NO_x$-free air. The amount of compressor air fed into the pressurized fluidized bed combustor 14 is controlled and balanced to obtain desired stoichiometry in the fuel-rich zone of topping combustor 16. The air in duct 42 may be preheated in conventional ways as by directing the air through the ash cooler (not shown) for combustor 14 or passing the air through heat exchanger tubes installed in the bed of the fluidized bed reactor. Preferred conditions for this reaction may comprise 30% to 65% excess air in the pressurized fluidized bed under operating conditions of 8 to 30 atmospheres pressure and a temperature of 1,400° to 1,900° F. The resulting off-gas may then be mixed with combustible gas from carbonizer 12 and reacted at an equivalence ratio (fuel/oxidizer) of approximately 1.5 to 3.0. Any necessary air for burnout and quenching in the topping combustor is supplied using the $NO_x$-free compressor air.

Equilibrium codes for the reactions involved in $NO_x$ removal predict that $NO_x$ can theoretically be removed down to a level of six parts per million. The present invention opens the way for removal of substantial amounts approaching this level.

This invention can also be successfully applied to any gasification system in which the oxidizer stream is $NO_x$ laden. Some examples include coal, biomass, or refuse gasifiers whose product gas is to be combusted using oxygen-rich flue gas from an atmospheric or pressurized combustor. This invention is not dependent on the MASB topping combustor and may be successfully applied using any combustor which provides a fuel-rich zone followed by a rapid quench and fuel-lean zone.

While the invention is described in terms of a specific embodiment, it is not to be understood as limited thereto, but is limited only as indicated by the appended claims.

We claim:

1. In a multi-stage process which comprises partially gasifying coal in a first, pressurized carbonizer reactor whereby combustible syngas and a particulate char are produced, firing the resulting char in a second, pressurized fluidized bed reactor with $NO_x$-free compressor air, producing a hot, oxygen-rich, $NO_x$-containing off-gas, mixing the syngas and the off-gas from the fluidized bed reactor, and burning the resulting mixture in a topping combustor having a first, fuel-rich zone and a second, fuel-lean zone downstream from said first zone, the improvement which comprises introducing said oxygen-rich, $NO_x$-containing off-gas into said first zone and introducing directly into said second zone as the only source of oxidizer being so introduced a $NO_x$-free, oxygen containing gas whereby combustion of gases entering the second zone in from said first zone is completed and $NO_x$ gases therein are removed, the amount of oxygen in the off-gas from the fluidized bed reactor being controlled by regulating the amount of $NO_x$-free air fed into said fluidized bed reactor to provide a combustible gas-to-oxygen equivalence ratio of 1.5 to 3.0 in the first zone of said topping combustor.

2. In a multi-stage process which comprises partially gasifying coal in a first, pressurized carbonizer reactor whereby combustible syngas and a particulate char are produced, firing the resulting char in a second, pressurized fluidized bed reactor with a $NO_x$-free oxygen-containing gas, producing a hot, oxygen-rich, $NO_x$-containing off-gas, mixing the syngas and the off-gas from the fluidized bed reactor, and burning the resulting mixture in a topping combustor having a first, fuel-rich zone and a second, fuel-lean zone downstream from said first zone, the improvement which comprises preheating said $NO_x$-free oxygen-containing gas with energy from at least one of said reactors, introducing the resulting preheated oxygen-rich, $NO_x$-containing off-gas into said first zone and introducing directly into said second zone as the only source of oxidizer being so introduced a $NO_x$-free, oxygen containing gas whereby combustion of gases entering the second zone in from said first zone is completed and $NO_x$ gases therein are removed.

3. The improvement as defined in claim 2 wherein said $NO_x$-free, oxygen containing gas is preheated with energy from said fluidized bed reactor.

* * * * *